US007983195B2

(12) United States Patent
Andreoletti et al.

(10) Patent No.: US 7,983,195 B2
(45) Date of Patent: Jul. 19, 2011

(54) METHOD OF ROUTING VIRTUAL LINKS IN A FRAME-SWITCHING NETWORK WITH GUARANTEED DETERMINISM

(75) Inventors: Remi Andreoletti, Urville-Nacqueville (FR); Frederic Minot, Venerque (FR)

(73) Assignee: Airbus Operations SAS, Toulouse (FR)

( * ) Notice: Subject to any disclaimer, the term of this patent is extended or adjusted under 35 U.S.C. 154(b) by 198 days.

(21) Appl. No.: 12/303,783

(22) PCT Filed: May 25, 2007

(86) PCT No.: PCT/FR2007/051331
§ 371 (c)(1),
(2), (4) Date: Dec. 8, 2008

(87) PCT Pub. No.: WO2007/147990
PCT Pub. Date: Dec. 27, 2007

(65) Prior Publication Data
US 2010/0195531 A1    Aug. 5, 2010

(30) Foreign Application Priority Data

Jun. 23, 2006    (FR) ...................................... 0652616

(51) Int. Cl.
*G01R 31/08*    (2006.01)
*G06F 11/00*    (2006.01)
*G08C 15/00*    (2006.01)
*H04J 1/16*    (2006.01)
*H04J 3/14*    (2006.01)
*H04L 12/26*    (2006.01)
*H04L 12/28*    (2006.01)
*H04L 1/00*    (2006.01)

(52) U.S. Cl. ......... 370/255; 370/254; 370/241; 370/248
(58) Field of Classification Search .................. 370/229, 370/244, 254, 255
See application file for complete search history.

(56) References Cited

U.S. PATENT DOCUMENTS 6,331,983 B1 * 12/2001 Haggerty et al. ............. 370/400
(Continued)

FOREIGN PATENT DOCUMENTS

EP        0 798 942 A2    10/1997
(Continued)

OTHER PUBLICATIONS

U.S. Appl. No. 12/303,423, filed Dec. 4, 2008, Andreoletti et al.
(Continued)

*Primary Examiner* — Ayaz R Sheikh
*Assistant Examiner* — Tarell Hampton
(74) *Attorney, Agent, or Firm* — Oblon, Spivak, McClelland, Maier & Neustadt, L.L.P.

(57) ABSTRACT

A method for routing virtual links in a frame switching network including a plurality of source terminals and/or destination of the frames, frame switches being connected together through physical connections, each virtual link being defined, for a point-to-point type, by a path through the network between a source terminal and a destination terminal and, for a multipoint type, by a plurality of paths through the network between a source terminal and a plurality of destination terminals. The method carries out routing of the links while observing a segregation constraint with regard to triplets of consecutive switches belonging to the oriented loops, so as to allow verification of determinism of the network.

7 Claims, 5 Drawing Sheets

U.S. PATENT DOCUMENTS

| | | | |
|---|---|---|---|
| 6,529,958 B1 | 3/2003 | Oba et al. | |
| 6,584,093 B1 | 6/2003 | Salama et al. | |
| 6,868,083 B2* | 3/2005 | Apostolopoulos et al. | 370/392 |
| 7,580,417 B2* | 8/2009 | Ervin et al. | 370/397 |
| 2003/0043756 A1 | 3/2003 | Reynders et al. | |
| 2004/0208204 A1* | 10/2004 | Crinon | 370/537 |
| 2005/0068903 A1* | 3/2005 | Perlman | 370/256 |
| 2006/0159034 A1* | 7/2006 | Talur et al. | 370/254 |
| 2006/0215568 A1* | 9/2006 | Smith | 370/241 |

FOREIGN PATENT DOCUMENTS

| | | |
|---|---|---|
| FR | 2 832 011 | 5/2003 |
| WO | WO 02/093999 A2 | 11/2002 |

OTHER PUBLICATIONS

J. J. Garcia-Luna-Aceves, "Distributed Routing with Labeled Distances", Proceedings of the Conference on Computer Communications, vol. 2, Conf. 11, XP010062193, May 4, 1992, pp. 633-643.

J. J. Garcia-Luna-Aceves, "Libra: A Distributed Routing Algorithm for Large Internets", Proceedings of the Global Telecommunications Conference, vol. 1, XP-10062445, Dec. 6, 1992.

J. J. Garcia-Luna-Aceves, "Loop-Free Routing Using Diffusing Computations", IEEE / ACM Transactions on Networking, vol. 1, No. 1, XP000362256, Feb. 1993.

ARINC Protocol Tutorial (1600100-0027), Condor Engineering, Document Revision:1.04, Document Date: Jun. 7, 2000, 27 Pages.

Rene L. Cruz, "A Calculus for Network Delay, Part I: Network Elements in Isolation", IEEE Transactions on Information Theory, vol. 37, No. 1, Jan. 1991, pp. 114-131.

Rene L. Cruz, "A Calculus for Network Delay, Part II: Network Analysis, Part II: Network Analysis", IEEE Transactions on Information Theory, vol. 37, No. 1, Jan. 1991, pp. 132-141.

J. Grieu, "Analysis and evaluation of Ethernet switching techniques for interconnecting avionic systems", 43 pages.

* cited by examiner

METHOD OF ROUTING VIRTUAL LINKS IN A FRAME-SWITCHING NETWORK WITH GUARANTEED DETERMINISM

TECHNICAL FIELD

The present invention relates to the field of routing in a frame-switching network and more particularly in an AFDX network.

STATE OF THE PRIOR ART

Ethernet networks are the most widely known local networks. They may operate under two distinct modes compatible with each other: a so-called shared mode, in which a same physical medium is shared among terminals, with random access and detection of collisions between frames, and a so-called switched mode, in which the terminals exchange frames through virtual links thereby guaranteeing absence of collisions.

In a switched Ethernet network, each terminal, either a source or a destination, is individually connected to a frame switch and the switches are connected to each other through physical connections. More specifically, each switch has a plurality of ports connected to the ports of other switches or terminal couplers. A virtual link between a source terminal and a destination terminal is defined as an oriented path through the network, followed by the frames of the source terminal sent to the destination terminal. Equivalently, a virtual link is defined by an ordered list of switches which are crossed by these frames. For each crossed switch, frame switching is accomplished from the address of the destination, by means of a pre-established switching table. This switching table is very simple since, depending on the input port of the switch and of the destination address of the frame, it indicates the corresponding output port. Subsequently, we will be interested in a frame switching network, the switching tables of which are predefined and we will subsequently designate as <<virtual link>> an end-to-end connection of level 2 in such a network, for example a virtual link in a switched Ethernet network.

It is possible to obtain a service guarantee for a virtual link. However, given that the switches can only support a given maximum throughput, this service guarantee imposes constraints on the routing of the links. The AFDX (Avionics Full Duplex Switched Ethernet) network, developed for the needs of aeronautics, is an example of a switched Ethernet network in which it is possible to assign a bandwidth through a virtual link. More specifically, a minimum interval between frames as well as a maximum frame size is associated with each virtual link. Furthermore, a maximum time for forwarding the frame, or latency limit, is guaranteed for each virtual link.

A detailed description of the AFDX network will be found in the document entitled <<AFDX protocol tutorial>> on the site www.condoreng.com as well as in Patent Application FR-A-2832011 filed in the name of the Applicant. Its main characteristics will simply be recalled hereafter.

As already mentioned, the AFDX network is based on a switched Ethernet network. It is further of the full-duplex type, each terminal being able to simultaneously transmit and receive frames over distinct virtual links. The AFDX network is also deterministic, in the sense that the virtual links have characteristics guaranteed in terms of bounded latency, physical segregation of flow, bandwidth and throughput. Each virtual link for doing this has a reserved end-to-end path, a time fragmentation into transmission gaps designated as BAGs (Bandwidth Allocation Gaps) and a maximum frame size. The frames are sent at the beginning of each transmission interval with predetermined jitter tolerance. Finally, the AFDX network is redundant, the underlying Ethernet network being duplicated for reasons of availability. The data are transmitted as encapsulated IP packets in Ethernet frames. Unlike conventional Ethernet switching (using the Ethernet address of the destination), frame switching on an AFDX network uses a virtual link identifier included in the frame header. When a switch receives a frame on one of its input ports, it reads the virtual link identifier and determines from its switching table the output port(s) over which it has to be transmitted. The switches verify on the fly the integrity of the transmitted frames without however requesting retransmission if a frame is erroneous: the frames detected as erroneous are removed. Frames transiting over a virtual link are sequentially numbered. Upon reception, the destination terminal verifies the integrity of the sequence of the frames.

Each virtual link is unidirectional. It can only stem from one source terminal at a time, but may end up at several destinations. Virtual links in a point-to-point (or unicast) mode only serving a single destination, are distinguished from virtual links in a multipoint (or multicast) mode which serve several of them.

FIG. 1 schematically illustrates an AFDX network comprising terminals $T_1$ to $T_6$ and frame switches $SW_1, SW_2$. It is seen that the virtual link $VL_3$ connecting the terminal $T_3$ to $T_2$ is of the point-to-point type whereas the virtual links $VL_2$ serving $T_2$ and $T_3$, and $VL^1$ serving $T_3$ to $T_5$ are of the multipoint type.

FIG. 2 schematically illustrates a switch in an AFDX network. It comprises a plurality of input buffers 210 of the FIFO type, frame filtering means 220, multiplexing means 230 and output buffers 240 of the FIFO type. The incident frames are stored in various input buffers, each buffer being connected to an input port $e_i$. The filtering means 220 remove the frames corresponding to an unrecognized virtual link, the erroneous frames and the frames leading to violation of the characteristics of a link. The multiplexing means 230 direct the frames towards the various output buffers 240 depending on the identifiers of virtual links which they contain and on the switching table. The output buffers transmit the frames over physical connections, each buffer being connected to an output port $p_i$.

The routing of the virtual links in an AFDX network consists of defining switching tables of the different switches of the network. The routing is selected so as to observe bandwidth constraints of different links. For a given routing solution, it is verified that the network is actually deterministic, i.e. the forwarding times on the various links are much less than the guaranteed latency bounds. To do this, a computing algorithm designated as <<network calculus>> is generally used, for which a description may be found in the articles of René L. Cruz entitled <<A calculus for network delay, Part I: network elements in isolation>> and <<Calculus for network delay, Part II: network analysis>>, published in IEEE Transactions on Information Theory, Vol. 37, No. 1, January 1991, pages 114-141. This algorithm evaluates in a non-probabilistic way for each element of the network, the maximum instantaneous data throughput at the output of the relevant element. The traffic transmitted by a source terminal over a virtual link $L_i$ is modeled by a maximum traffic rate function, still called a flow envelope function $R_i(t)$ depending on the maximum length of the frames and on the minimum time interval separating two frames of the link, i.e.:

$$R_i(t) = s_{max} + \frac{s_{max} \cdot t}{BAG} \quad (1)$$

wherein $s_{max}$ is the maximum size of the frame and BAG is a quantity called a bandwidth allocation gap of the link, in other words BAG is the minimum time interval separating two frames of said link. The amount of data generated over the link during the time interval $[t_0,t_1]$ is then simply expressed as $$\int_{t_0}^{t_1} R_i(t)\,dt.$$

For each element of the network, the flow envelope is determined at the output of this element from the input flow envelope and from a transfer function of said element, further called a service curve. Depending on the flow envelopes at the input and at the output, it is known to bound by upper values, the size of the queue of the element (backlog work of the element) and the delay undergone by a packet passing through this element. The flow envelopes at each point of the network are thereby computed step by step, starting with the source terminals and advancing towards the destination terminals. The latency time relative to a virtual link is estimated from the delays undergone in the elements crossed by this link and, if necessary, from the propagation times between these elements. It is then verified whether the estimated latency times are actually in accordance with the desired guaranteed values for the different links of the network.

A description of the application of the <<network calculus>> algorithm to computing latency times will be found in the thesis of J. Grieu entitled <<Analyse et évaluation de techniques de commutation Ethernet pour l'interconnexion des systèmes avioniques>> (Analysis and evaluation of Ethernet switching techniques for interconnecting avionic systems) dated Sep. $24^{th}$ 2004.

The verification method described above works well as long as the network does not include any physical loop. A contrario, if such a loop is present in the network, the latency times of the links following the loop cannot be determined.

FIG. 3 illustrates the situation of an AFDX network comprising a loop with three switches: $SW_1, SW_2, SW_3$. Each switch has three physical ports, each port consisting of an input port and of an output port. The output port $p_1$ of the switch $SW_1$ is connected to the input port $e_3$ of the switch $SW_3$. The output port $p_3$ of the switch $SW_3$ is connected to the input port $e_2$ of the switch $SW_2$. The output port $p_2$ of the switch $SW_2$ is connected to the input port $e_1$ of the switch $SW_1$. The path C passing through the ports $p_1, e_3, p_3, e_2, p_2, e_1$ forms an oriented loop within the network. The flow envelope on the output port $p_1$ depends on the flow envelope in $e_1$, i.e. of $p_2$, and of that of the link $VL_1$ (at the input of $SW_1$). Similarly, the flow envelope in $p_2$ in turn depends on the flow envelope in $p_3$ and of that of the link $VL_3$. Finally, the flow envelope in $p_3$ in turn depends on the flow envelope in $p_1$ and of that of the link $VL_2$. It is seen that there is a circular dependency relationship which makes estimation of the flow envelope and therefore of the latency times impossible.

FIG. 4 illustrates the situation of an AFDX network comprising a loop with four switches: $SW_1, SW_2, SW_3, SW_4$. Each switch has four physical ports, each port consisting of an input port and of an output port. It is noted that four virtual links $VL_1$ to $VL_4$ have been routed in the network.

The flow envelope of the output port 23 of $SW_1$ depends on the flow envelope of the output port 5 of $SW_3$ and of that of the link $VL_1$. The flow envelope of the output port 5 of $SW_3$ depends on the flow envelope of the output port 23 of $SW_4$ and on that of the link $VL_3$. The flow envelope of the output port 23 of $SW_4$ depends on the flow envelope of the output port 24 of $SW_2$ and on that of the link $VL_4$. Finally, the flow envelope of the output port 24 of $SW_2$ depends on the flow envelope of the output port 23 of $SW_1$ and on that of $VL_2$.

There again, with the circular dependency relationship, the flow envelopes and therefore the latency times cannot be estimated.

In order to avoid circular dependencies, changing the topology of the network is known, for example adding a physical connection between non-connected switches of the loop or even adding a central switch connected to several or to all the switches of the loop. In both cases, the change in topology locally increases the number of possible routing paths of the virtual links, so that it is possible to change the initial routing and to break the circular dependency. However, it is not certain that new loops will thereby not be created or that the routing of a new link will not cause a new circular dependency. One would then have returned to the previous case and the incapacity to verify the determinism of the network would lead to new complexification of the topology of the network.

The object of the present invention is to propose a method for routing virtual links in a frame switching network which allows a sure verification of the determinism of the network, without changing its topology.

DISCUSSION OF THE INVENTION

The present invention is defined by a method for routing virtual links in a frame switching network comprising a plurality of source terminals and/or destination of said frames, frame switches being connected to each other through physical connections, each virtual link being defined, for a point-to-point type, by a path through said network between a source terminal and a destination terminal and, for a multipoint type, by a plurality of paths through said network between a source terminal on the one hand and a plurality of destination terminals on the other hand. The method comprises the following steps:

(a) searching for oriented loops in the network, to within a circular permutation of the switches which they contain;
(b) selecting a triplet of consecutive switches within each oriented loop, each triplet defining a forbidden routing path;
(c) determining a routing solution for the virtual links which do not follow said forbidden paths;
(d) verifying the determinism of the network on the basis of the thus routed virtual links.

If the determinism of the network is confirmed, it is then possible to store in the switches the switching tables corresponding to said routing solution.

Verification of the determinism of the network advantageously comprises computation of the flow envelopes at the output of the switches crossed by the virtual links and of the latency times relative to these links, the thereby obtained latency times being then compared with set latency bounds.

According to an advantageous embodiment, triplets common to the largest number of oriented loops as possible, are selected in steps (b).

It is also possible to select with priority in step (b) triplets belonging to routing paths forbidden by a topological constraint. This topological constraint may for a network partitioned into distinct areas powered by independent power supplies, consist of forbidding:

any routing path crossing a boundary between two areas, when the switches respectively connected to the source terminal and to the destination terminal of the virtual link belong to the same area;

any routing path crossing more than once a boundary between two areas, when the switches respectively connected to the source terminal and to the destination terminal of the virtual link belong to different areas.

In a preferred application, the frame switching network is an AFDX network.

Finally, the invention further relates to a computer program comprising software means adapted to perform the steps of the method above, when it is run on a computer.

SHORT DESCRIPTION OF THE DRAWINGS

FIG. 1 schematically illustrates an exemplary AFDX network;

FIG. 2 schematically illustrates the structure of a switch in an AFDX network;

DETAILED DISCUSSION OF PARTICULAR EMBODIMENTS

The idea at the basis of the invention is to perform the routing of a virtual link by selecting from the possible paths, those which respond to a specific segregation constraint with parts of oriented loops of the network.

In the following, any ordered sequence l of nodes or of switches of the network $l=SW_1,SW_2, \ldots, SW_N$ with $N \geq 3$ such that $SW_{i+1} \in G(SW_i)$ for $i=1, \ldots, N-1$ and $SW_1 \in G(SW_N)$ will be designated as an oriented loop, wherein G is an application which establishes a correspondence of each switch SW with the set of its successors, i.e. the set of the switches directly connected to an output port of SW. In a full-duplex network where each physical port comprises an input port and output port, it will be understood that if there exists an oriented loop $SW_1,SW_2, \ldots, SW_N$ in the network, then $SW_N, SW_{N-1}, \ldots, SW_1$ is also an oriented loop but in the opposite direction.

Before carrying out the routing of the virtual links, the method according to the invention makes an inventory of the oriented loops of the network. To do this, the network may be illustrated as an oriented graph, the apices of which are the switches and the terminals and the output-port-to-input-port connections are the arcs. Searching for oriented loops in the network amounts to searching for circuits in the graph. For this purpose, each apex of the graph is labelled with a label. Each apex transmits to its successors its label, and each of these successors then concatenates the label which it has received with its own label and transmits the thereby concatenated label to its own successors. Propagation of the labels is continued step by step. When an apex receives a list of labels comprising its own, a circuit is identified and the propagation of this list is stopped. The circuits are then grouped by equivalence classes: the oriented circuits/loops of a same class are identical to within a circular permutation. One oriented loop per equivalence class is arbitrarily selected for representing it.

The oriented loops having been identified, they are sorted by the number of crossed switches. Let us consider such an oriented loop, illustrated in FIG. 5A. It here corresponds to a physical loop of six switches $SW_1$ to $SW_6$. A virtual link VL which penetrates into the loop in a switch $SW_i$ and emerges at the next switch $SW_{i+1}$ is not capable of inducing a circular dependency relationship in the loop, regardless of the number of already routed virtual links on the loop and the number of switches which the latter share with it. Indeed, as the relevant link VL does not cross two output ports of consecutive switches, it does not induce any relationship between the flow envelopes at the output of these switches.

Figure 1:
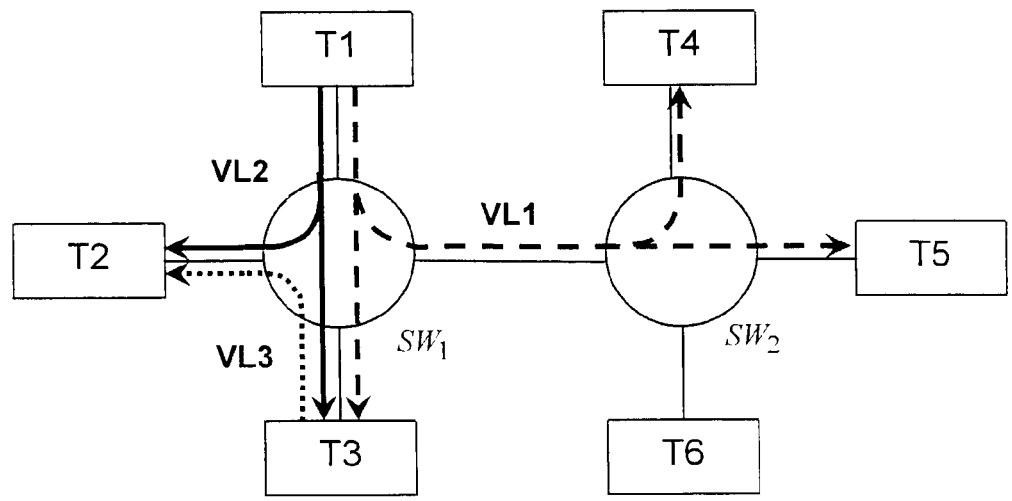
Figure 2:
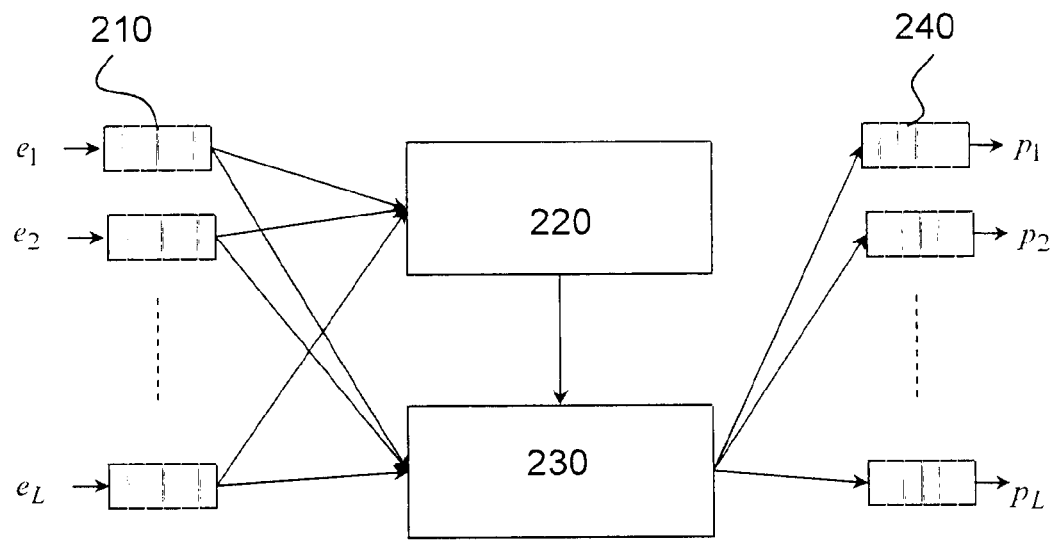
Figure 3:
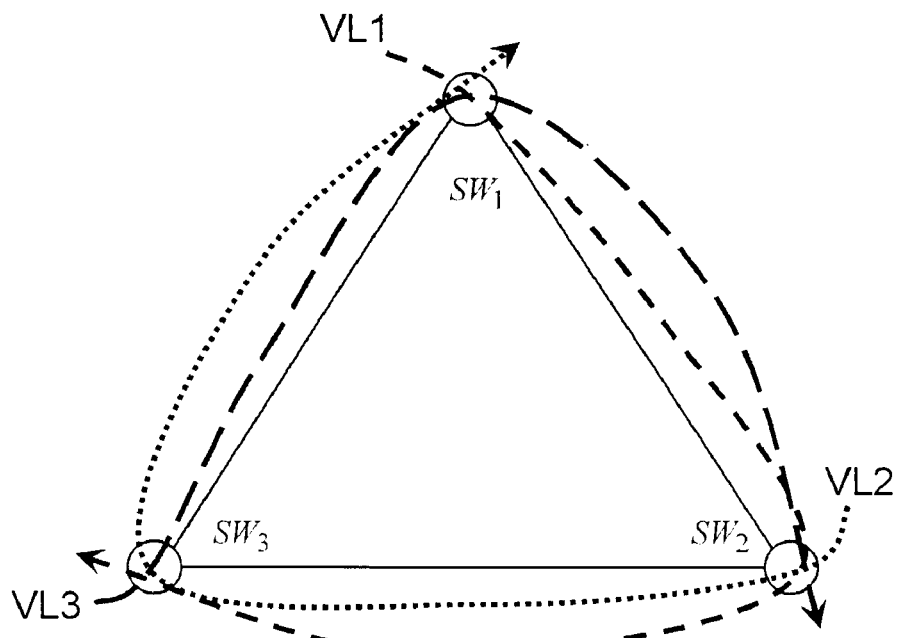
FIG. 3 illustrates the situation of an AFDX network comprising a loop with three switches.
Figure 4:
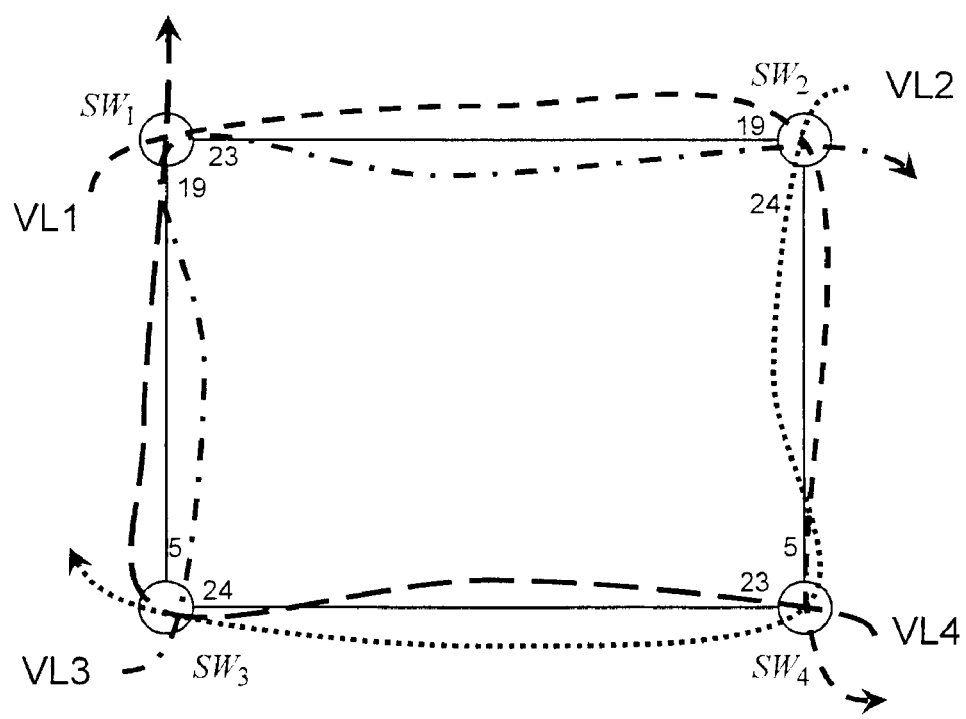
FIG. 4 illustrates the situation of an AFDX network comprising a loop with four switches.
Figure 5A:
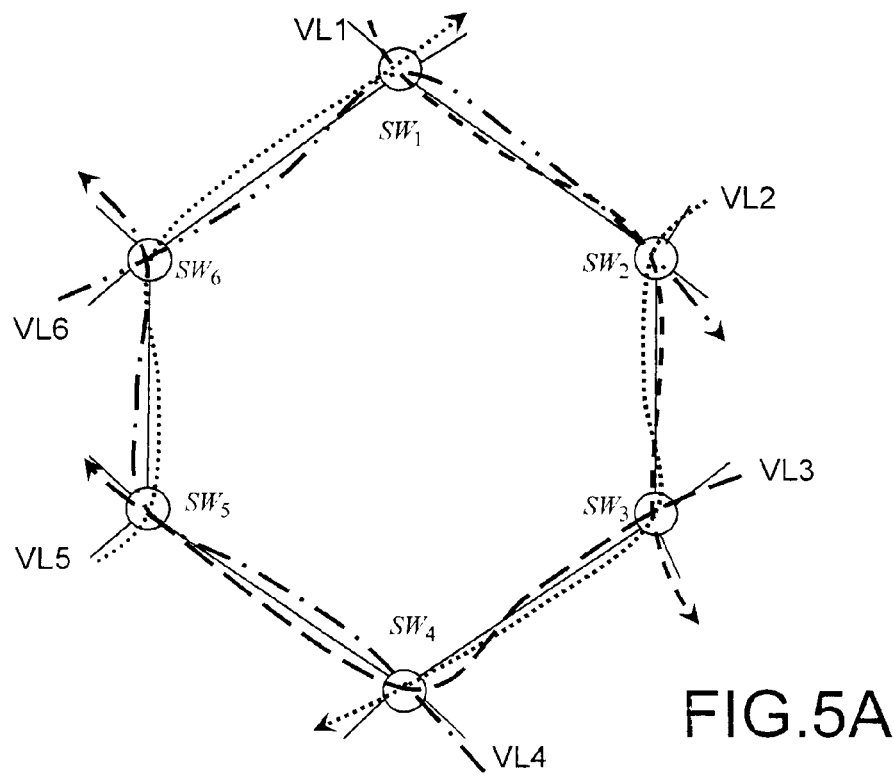
FIGS. 5A and 5B illustrate the operating principle of the invention.

It is thus understood that circular dependency can only be induced when a virtual link shares at least three successive switches, i.e. at least two common output ports with the oriented loop. If the virtual links exactly sharing three switches with the oriented loop of FIG. 5A are considered, it is noted that at least six of these links $VL_1, \ldots, VL_6$ are required for obtaining a cover of the loop and consequently circular dependency. Generally for an oriented loop of N switches, dependency may be obtained with at least N links having exactly three switches common with the loop, a fortiori for N links having more than three switches common with the loop. For links exactly sharing M>2 switches with the oriented loop, at least $$E\left(\frac{N}{M-2}\right)$$

of such links will be required for obtaining a circular dependency relationship, where E(.) expresses the integer value.

Figure 5B:
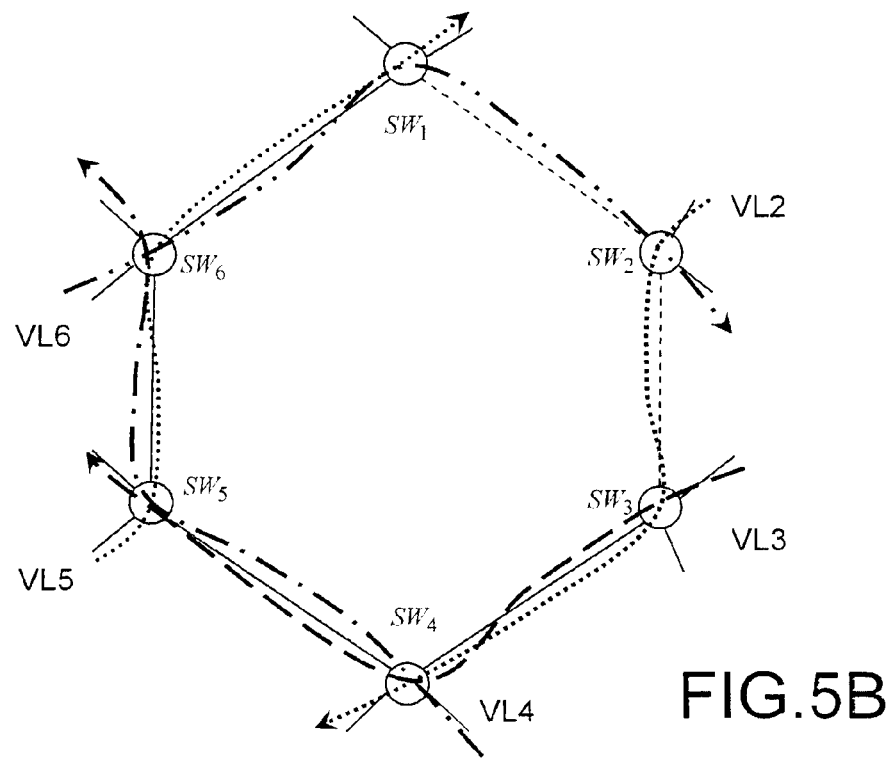

Let us now suppose that for a given oriented loop, a routing path corresponding to three successive apices of the loop is suppressed. The situation has been illustrated in FIG. 5B where the path $SW_1,SW_2,SW_3$, illustrated in broken lines, is forbidden for routing. By means of this constraint, it is no longer possible to obtain a cover of the loop with virtual links causing a circular dependency. Indeed, the virtual link $VL_1$ is no longer allowed and any virtual link responding to the prescribed constraint contains at the very most the path $SW_1$, $SW_2$ or the path $SW_2,SW_3$. None of the virtual links and in particular neither $VL_6$ and $VL_2$, allow a relationship to be induced between the flow envelopes of the switches $SW_1$ and $SW_3$.

It is seen that by forbidding any routing path passing through three given successive switches of the oriented loop, any risk of circular dependency is removed. Further, the number of routing possibilities of virtual links is relatively not very affected by this ban (reduction by a third at most, for a three switch loop).

One proceeds for each oriented loop as described above. Advantageously, routing paths common to several loops are forbidden so as to reduce their number.

Figure 6:
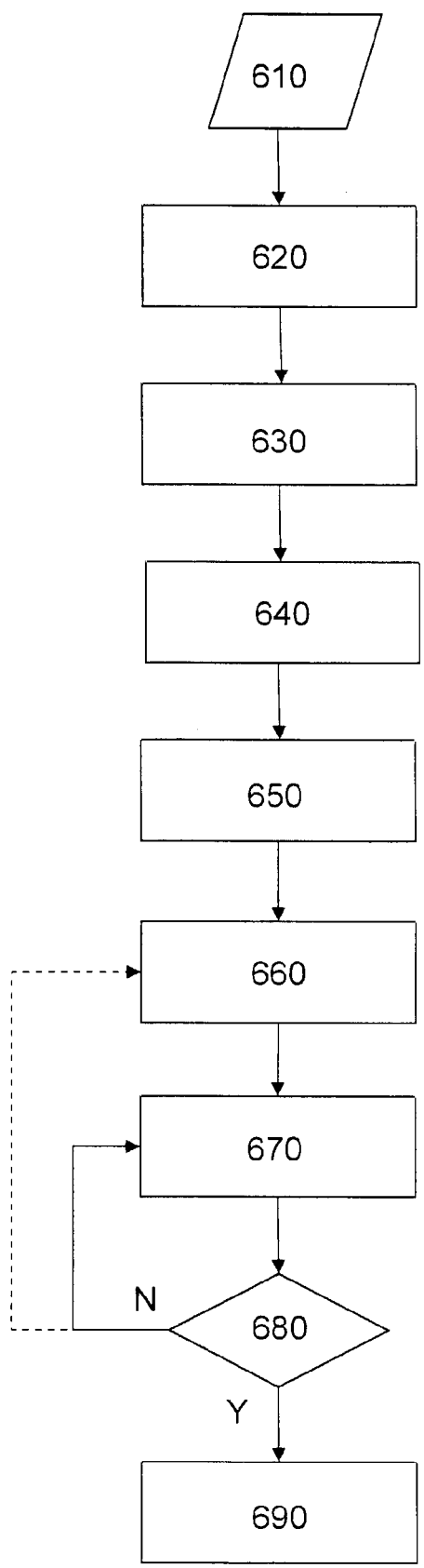
FIG. 6 illustrates a flowchart of the routing method according to the invention.

FIG. 6 illustrates the flowchart of the routing method according to the invention. From the description of the topology of the network 610, all the oriented loops of the network are inventoried to within a circular permutation, in 620. In 630, they are sorted by the number of crossed switches. For each thereby obtained oriented loop, in 640, all the triplets of consecutive switches of the loop are then identified. In 650, a search for triplets common to several loops is performed. In step 660, one triplet per loop is selected. Advantageously, it will be selected by taking by order of preference, the triplets who are shared by the largest number of loops as possible. The selected triplets define forbidden routing paths; by forbidding routing through a path the circular dependency relationship may be broken for the loop or the loops to which it belongs.

In 670, a solution for routing the virtual links is determined while observing the constraints established in 660.

In step 680, for the routing solution found in 670, it is checked whether the network is actually deterministic by estimating the flow envelopes at the output of the switches crossed by the links, and then the latency times for the different links. The obtained latency times are then compared with the set latency bounds for said links.

If determinism is confirmed, the switching tables corresponding to the routing solution are established and stored in the switches. If determinism is not confirmed, a new routing solution is attempted in 670 or, by default; a new selection of forbidden routing paths is attempted in 660, as indicated in broken lines.

Figure 7:
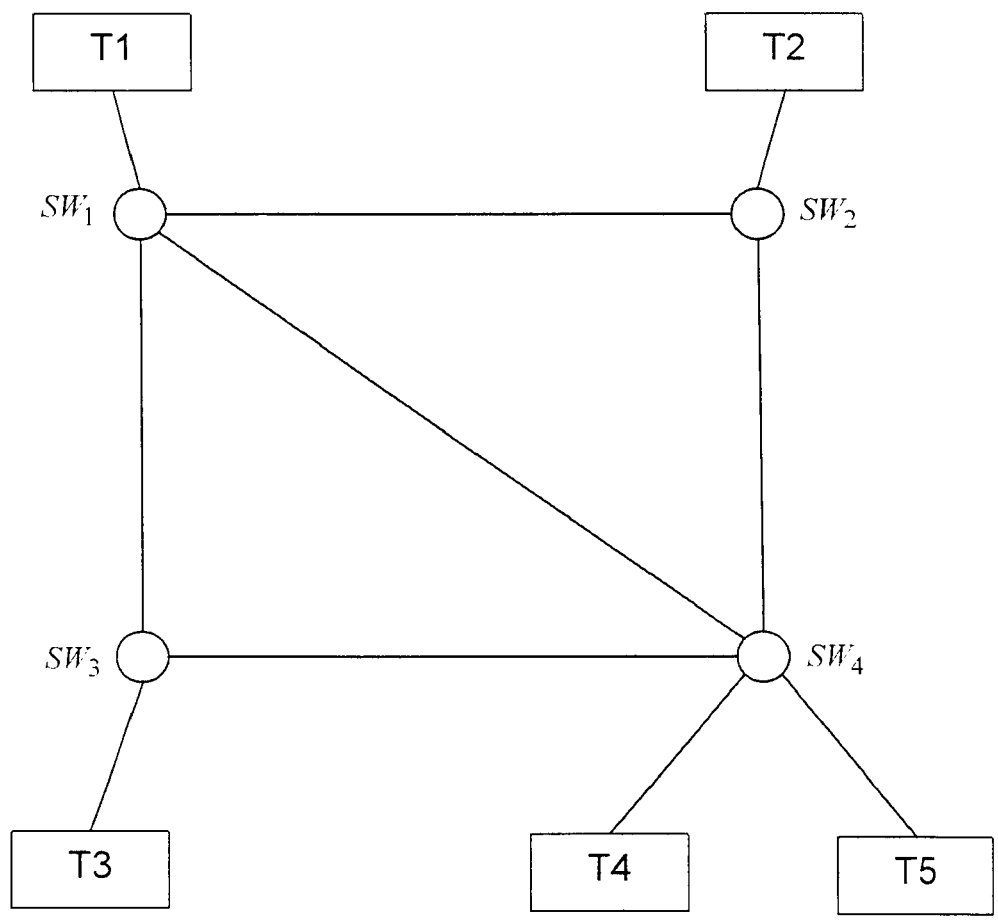
FIG. 7 illustrates a simplified AFDX network example for applying the routing method according to the invention.

FIG. 7 illustrates a simplified AFDX network example for illustrating the routing method according to the invention.

The network comprises five terminals $T_1$ to $T_5$ which may each be a source or a destination, and four switches $SW_1$ to $SW_4$. The oriented loops of the network are identified to within a circular permutation:

for the 3-switch loops:
$1_1^{cw}=SW_1,SW_2,SW_4$; $1_1^{ccw}=SW_4,SW_2,SW_1$;
$1_2^{cw}=SW_1,SW_4,SW_3$; $1_2^{ccw}=SW_3,SW_4,SW_1$;
for the 4-switch loops:
$1_3^{cw}=SW_1,SW_2,SW_4,SW_3$; $1_3^{ccw}=SW_3,SW_4,SW_2,SW_1$;

For each of the loops, the triplets which are candidates for the forbidden routing paths are listed:
loop $1_1^{cw}$: $\{SW_1,SW_2,SW_4\};\{SW_2,SW_4,SW_1\};\{SW_4,SW_1,SW_2\}$
loop $1_1^{ccw}$: $\{SW_4,SW_2,SW_1\};\{SW_2,SW_1,SW_4\};\{SW_1,SW_4,SW_2\}$
loop $1_2^{cw}$: $\{SW_1,SW_4,SW_3\};\{SW_4,SW_3,SW_1\};\{SW_3,SW_1,SW_4\}$
loop $1_2^{ccw}$: $\{SW_3,SW_4,SW_1\};\{SW_4,SW_1,SW_3\};\{SW_1,SW_3,SW_4\}$
loop $1_3^{cw}$: $\{SW_1,SW_2,SW_4\};\{SW_2,SW_4,SW_3\};\{SW_4,SW_3,SW_1\};\{SW_3,SW_1,SW_2\}$
loop $1_3^{ccw}$: $\{SW_3,SW_4,SW_2\};\{SW_4,SW_2,SW_1\};\{SW_2,SW_1,SW_3\};\{SW_1,SW_3,SW_4\}$ In order to remove any risk of circular dependency, it is sufficient to select one triplet per loop and to forbid routing through the corresponding paths. Advantageously, as already mentioned, triplets which are common to the largest number of loops as possible are selected, in order to reduce the number of forbidden paths. In the present case:
$\{SW_1,SW_2,SW_4\}$, common to $1_1^{cw}$ and $1_3^{cw}$;
$\{SW_4,SW_2,SW_1\}$, common to $1_1^{ccw}$ and $1_3^{ccw}$;
$\{SW_1,SW_4,SW_3\}$ for $1_2^{cw}$ and $\{SW_3,SW_4,SW_1\}$ for $1_2^{ccw}$
will be selected for example.

Thus, only 4 paths will be forbidden instead of the 6 required theoretically.

In practice, as the routing constraint is imposed, verifying the determinism of the network is not the only constraint to be taken into consideration for the routing of virtual links. For example, in an avionic application, partitioning the network into distinct areas powered by independent power supply sources is known. For security reasons, a topological constraint is then set, designated hereafter as a partition constraint, consisting of forbidding:

any routing path crossing a boundary between areas, if the switches respectively connected to the source terminal and to the destination terminal belong to the same area;

any routing path crossing more than once a boundary between areas, if the switches respectively connected to the source terminal and to the destination terminal belong to distinct adjacent areas.

In a first phase, the set S of the forbidden routing paths in the sense of the partition constraint are inventoried. For a given virtual link to be routed, observance of this constraint is equivalent to a segregation of the link with regard to the paths of S.

Generally, according to an embodiment of the invention, a set S of forbidden paths will be available, prior to applying the routing constraint associated with the verification of the determinism of the network. Upon selecting the switch triplet per oriented loop, a triplet will be advantageously selected belonging to an already forbidden path of the set S. Of course, if several triplets of the loop belong to S, the one which is common to the largest number of oriented loops as possible will be selected with priority. Thus, the number of paths to be excluded for verification of the determinism will increase by a relative small amount.

The invention claimed is:

1. A method for routing virtual links in a frame switching network including a plurality of source terminals and destination terminals of frames, frame switches being connected together through physical connections, each virtual link being defined for a point-to-point type, by a path through the network between a source terminal and a destination terminal and, for a multipoint type, by a plurality of paths through the network between a source terminal and a plurality of destination terminals, the method comprising:
   (a) searching for oriented loops in the network, up to a circular permutation of the switches they contain;
   (b) selecting a triplet of consecutive switches within each oriented loop, each triplet defining a forbidden routing path;
   (c) determining a routing solution for the virtual links not following the forbidden paths; and
   (d) verifying determinism of the network on the basis of the thus routed virtual links by:
      computing flow envelopes at the output of the switches crossed by the thus routed virtual links,
      computing the latency times relative to these links, and comparing the thus obtained latency times with set latency limits.

2. The routing method according to claim 1, wherein, if the determinism of the network is confirmed, the switching tables corresponding to the routing solution are stored in the switches.

3. The routing method according to claim 1, wherein triplets common to the largest number of oriented loops as possible are selected in the selecting (b).

4. The routing method according to claim 1, wherein triplets belonging to routing paths forbidden by a topological constraint are selected with priority.

5. The routing method according to claim 4, wherein the topological constraint for a network partitioned into distinct areas powered by independent power supplies, forbids:
   any routing path crossing a boundary between two areas, when the switches respectively connected to the source terminal and to the destination terminal of the virtual links belong to the same area; and
   any routing path crossing more than once a boundary between areas, when the switches respectively connected to the source terminal and to the destination terminal of the virtual link belong to different areas.

6. The routing method according to claim 1, wherein the frame switching network is an AFDX network.

7. A non-transitory computer readable medium storing computer executable instructions, wherein the instructions, when executed by a computer, cause the computer to perform the routing method according to claim 1.

* * * * *